United States Patent [19]

Murakami

[11] Patent Number: 4,821,110

[45] Date of Patent: Apr. 11, 1989

[54] METHOD OF AND APPARATUS FOR CORRECTING A READ POSITION ERROR IN SUBSCANNING DIRECTION OF A LINE IMAGE SENSOR

[75] Inventor: Shigeo Murakami, Kyoto, Japan

[73] Assignee: Dainippon Screen Mfg. Co., Ltd., Kyoto, Japan

[21] Appl. No.: 141,149

[22] Filed: Jan. 6, 1988

[30] Foreign Application Priority Data

Jan. 8, 1987 [JP] Japan .................................. 62-2070

[51] Int. Cl.$^4$ .......................... H04N 1/04; H04N 1/40
[52] U.S. Cl. ..................................... 358/285; 358/293; 358/294
[58] Field of Search ............... 358/280, 285, 293, 294; 250/557

[56] References Cited

U.S. PATENT DOCUMENTS

| | | | |
|---|---|---|---|
| 4,338,637 | 7/1982 | Ueno | 358/256 |
| 4,465,939 | 8/1984 | Tamura | 358/294 |
| 4,712,134 | 12/1987 | Murakami | 358/213.13 |

Primary Examiner—James J. Groody
Assistant Examiner—Kim Yen Vu
Attorney, Agent, or Firm—Lowe, Price, LeBlanc, Becker & Shur

[57] ABSTRACT

Amounts of read position errors in subscanning direction with respect to respective scanning positions of line image sensors, which are provided in parallel with main scanning direction, are found in advance by a number of scanning lines. In actual scanning, output image signals from the line image sensors are delayed, in respective main scanning positions of the output image signals, by respective line numbers corresponding to the respective found amounts of read position errors in the subscanning direction, and are output.

10 Claims, 4 Drawing Sheets

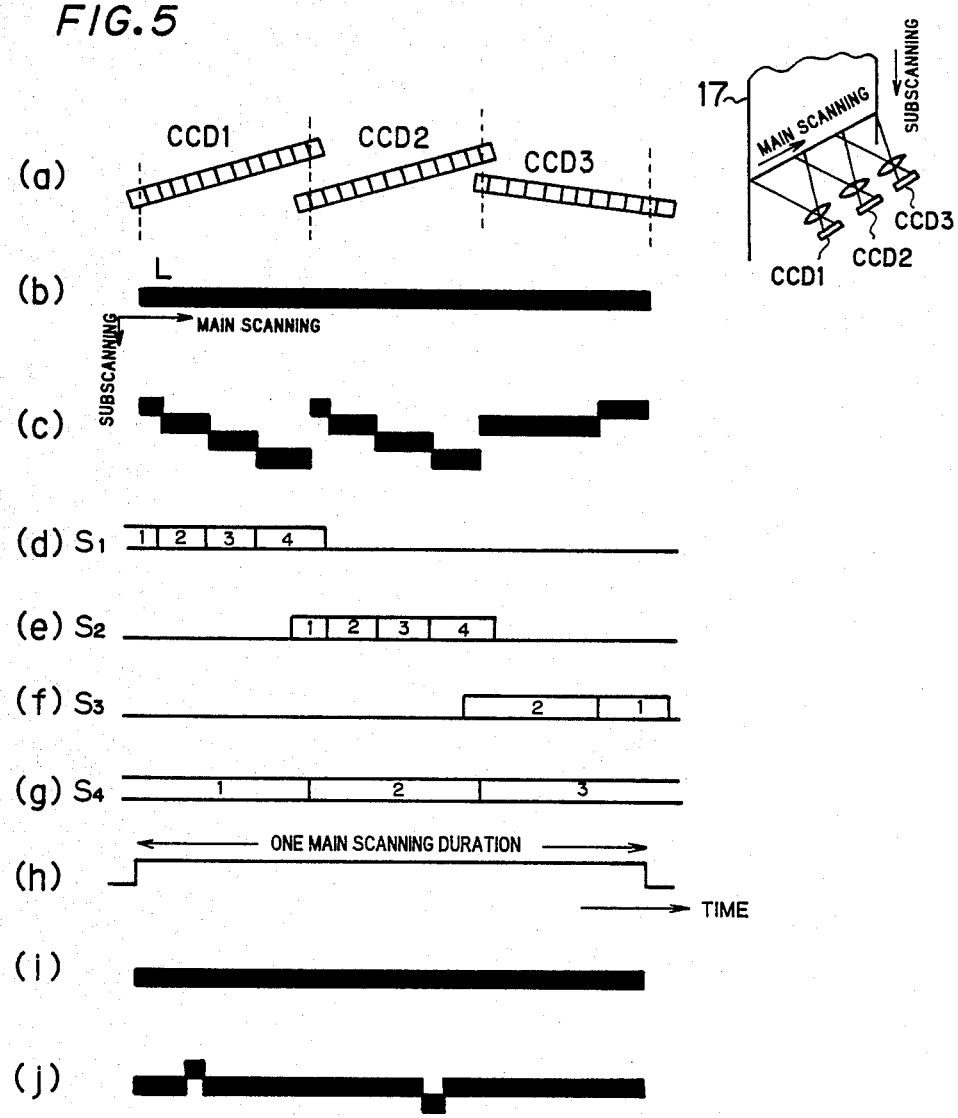

(a) CLOCK CLK (b) MEMORY ADDRESS Addr (c) READ ENABLE $\overline{RE}$ (d) SELECTION SIGNAL $S_5$ (e) LATCH CONTROL LC (f) WRITE ENABLE $\overline{WE}$

METHOD OF AND APPARATUS FOR CORRECTING A READ POSITION ERROR IN SUBSCANNING DIRECTION OF A LINE IMAGE SENSOR

BACKGROUND OF THE INVENTION

1. Field of the Invention

The present invention relates to a method of and an apparatus for correcting a read position error in subscanning direction in scanning and inputting of image data by a line image sensor arranged in parallel with the main scanning direction.

2. Description of the Prior Art

In recent years, requirement is increased for reading a large original in high resolution as demand is increased for organization of a data base by various technical materials such as design drawings and maps. In the field of electronic process for commercial printing, for example, it is also required to read an original in extremely high resolution. Efforts have been made to increase a pixel number of a line image sensor, whereas the current upper limit thereof is about 5000 pixels. For example, 24,000 pixels are required in order to read an original of A1 (Japan Industrial Stardard) size (about 600 mm in width) in resolution of 40 lines/mm and, therefore, the original must be divided to be read, into five in the main scanning direction by employing five line image sensors of 5,000 pixels. In this case, each line image sensor must read image signals on the same main scanning line, as a matter of course. Pixel size of a line image sensor tends to be reduced as the pixel number thereof is increased. In the case of 5,000 pixels, for example, each pixel is in extremely small size of 7 μm×7 μm. Therefore, it is extremely difficult to so strictly arrange a plurality of line image sensors that the respective line image sensors correctly read on an absolutely identical main scanning line. Even if complete arrangement is performed in manufacturing, it is almost impossible to so maintain mechanical accuracy that no deviation is caused by vibration in transportation, time transition, temperature change and the like.

Although the problem of misarrangement between plural line image sensors cannot arise in the case of employing only a single line image sensor, it is still difficult to maintain strict positional accuracy of the sensor for a long time like the aforementioned case of employing a plurality of line image sensors, and a slight inclination error may be caused with respect to the main scanning direction. Thus, read position error in the subscanning direction will be inevitably caused to lower the quality of read images to some extent in either case, and the problem of such lowering of picture quality is serious particularly in the aforementioned field requiring image reading of high resolution.

SUMMARY OF THE INVENTION

The present invention is directed to a method of and an apparatus for correcting a read position error in subscanning direction in scanning and inputting of image data by a line image sensor arranged in parallel with the main scanning direction.

Accordingly, an object of the present invention is to overcome the aforementioned disadvantages of the prior art and provide a method of and an apparatus for correcting a read position error in a subscanning direction, which can easily correct a read position error in a subscanning direction through simple structure in scanning and inputting of image data by a line image sensor, thereby to effectively prevent lowering in quality of read images.

To attain the above objective, in accordance with an aspect of the invention, there is provided a method of correcting a read position error in subscanning direction in scanning and inputting of image data by a line image sensor provided in parallel with main scanning direction, said method comprising steps of: finding an amount of said read position error in said subscanning direction with respect to each main scanning position of said line image sensor by a number of scanning lines; and relatively delaying an output image signal from said line image sensor with respect to each said main scanning position on the basis of said number of scanning lines corresponding to said amount of the read position error in the subscanning direction thus found, to output the same.

In a preferred embodiment, a plurality of said line image sensors are arranged in the main scanning direction to read one main scanning line in a divided manner.

In another preferred embodiment, said amount of the read position error in the subscanning direction with respect to each main scanning position is found by reading an original of a straight line in parallel with the main scanning direction.

PreferablY, said delaying step includes steps of: creating image signals by delaying said output image signal of said line image sensor by 0 to n (n: natural number) lines; and selecting one of said created image signals in accordance with said number of scanning lines corresponding to said amount of the read position error in the subscanning direction.

In accordance with another aspect of the invention, there is provided an apparatus for correcting a read position error in subscanning direction in scanning and inputting of image data by a line image sensor provided in parallel with main scanning direction, said apparatus comprising: means for indicating an amount of a read position error in the subscanning direction with respect to each main scanning position of said line image sensor, said amount being found in advance by a number of scanning lines; and means for delaying an output image signal from said line image sensor with respect to in each main scanning position by said number of scanning lines corresponding to said amount of the read position error in the subscanning direction, on the basis of said indication, and outputting the same.

In a preferred embodiment, a plurality of said line image sensors are arranged in the main scanning direction to read one main scanning line in a divided manner.

In another preferred embodiment, said amount of the read position error in the subscanning direction with respect to each main scanning position of said line image sensor indicated by said indicating means is found by reading an original of a straight line parallel to the main scanning direction.

Preferably, said means for delaying and outputting the output image signal of said line image sensors comprises: means for creating image signals by delaying the output image signal of said line image sensor by 0 to n (n: natural number)lines; and means for selecting one of said created image signals in accordance with indication by said indicating means.

More preferably, said means for creating said image signals includes n line memories for delaying the output image signal of said line image sensor by 1 to n lines.

Still preferably, said means for creating said image signals includes a memory IC for delaying the output image signal of said line image signal by 1 to n lines, a word of said memory IC being formed by n bits.

According to the present invention, read position error in the subscanning direction can be readily corrected in simple structure, in scanning and inputting of image data by a line image sensor, so that lowering of quality of read images is effectively prevented. Particularly, the present invention is effective for correction of fine positional error between line image sensors, in the case of performing divided reading in the main scanning direction by a plurality of line image sensors.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an explanatory view showing arrangement of line image sensors;

FIG. 5 is an explanatory view showing operation of the embodiment shown in FIG. 1;

DESCRIPTION OF THE PREFERRED EMBODIMENTS

Figure 1:
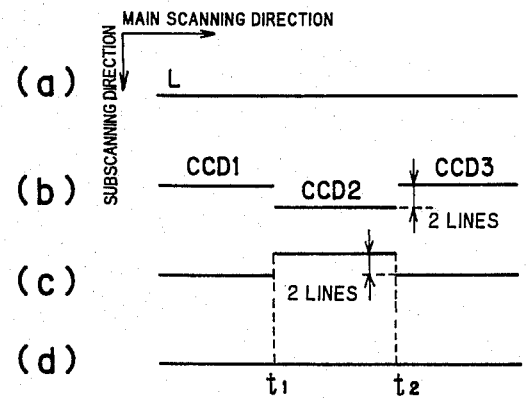
FIG. 1 is a block diagram showing an embodiment of the present invention.
Figure 2:
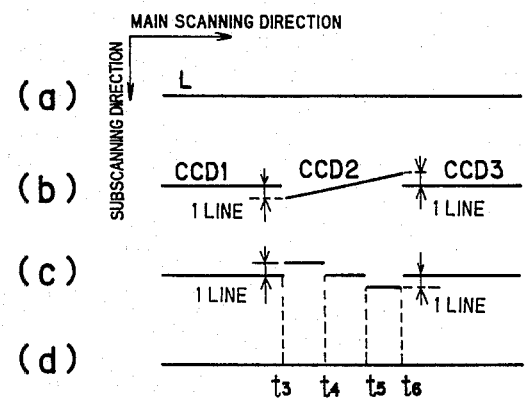
FIGS. 2(a) to 2(d) and FIG. 3 are explanatory views showing the concept of the present invention.

FIGS. 1 and 2 are explanatory views showing an embodiment of the present invention wherein a read position error in a subscanning direction is corrected when image data is scanned and input by three line image sensors (hereinafter referred to as CCD1 to CCD3) arranged in a main scanning direction. Within the figures, FIGS. 1(b) and 2(b) show positional relation on an original of the CCD's 1 to 3, in which the central CCD 2 is misarranged with respect to a correct read position in either case.

In order to find amounts of read position error in the subscanning direction, the original of a straight line L shown at FIGS. 1(a) and 2(a), which is parallel to the main scanning direction, is scanned by the CCD's 1 to 3, to obtain scanning input image signals shown at FIGS. 1(c) and 2(c). When, for example, an image reader provided with the CCD's 1 to 3 is connected to an image display such as a CRT or to a drawing apparatus such as a laser beam printer, the output result thereof may be recognized to observe the scanning input image signals, while output signals from the CCD's 1 to 3 may be observed through an oscilloscope etc. if the image reader is not connected to a suitable output device.

Through such observation, it is recognized that the CCD 2 is misarranged by, for example, two lines with respect to the CCD's 1 and 3 in the case of FIG. 1 and, therefore, a scanning output signal for the straight line L by the CCD 2 is obtained in a delay by two lines with respect to those by the CCD's 1 and 3. In the case of FIG. 2, the CCD 2 is obliquely misarranged by one line in the boundary between the CCD 1 and by one line in the boundary between the CCD 3 and, therefore, it is recognized that a scanning output signal for the straight line L by the CCD 2 is obtained in a delay by one line in one side close to the CCD 1, in advance by one line in the other side close to the CCD 3 and in no advance/delay in a central portion, with respect to those by the CCD's 1 and 3.

Through the above observation, there are previously found main scanning times $t_1$ to $t_6$ at which steps (i.e., read position errors in the subscanning direction) are caused in the scanning input images shown at FIGS. 1(c) and 2(c), and also the number of scanning lines representing the amounts of the read position errors at those times $t_1$ to $t_6$, respectively. In actual scanning, output image signals of the CCD's 1 to 3 are always stored retroactively by a predetermined number of lines from current scanning, and a signal which is relatively advanced by two lines from output image signals of the CCD's 1 and 3 is selected and outputted as the output image signal of the CCD 2 between the times $t_1$ and $t_2$ in the case shown in FIG. 1 In the case depicted in FIG. 2, a signal which is relatively advanced by one line from output image signals of the CCD's 1 and 3 is selected and outputted as the output image signal of the CCD 2 between the times $t_3$ and $t_4$, a signal with no advance/delay is selected and outputted between the times $t_4$ and $t_5$ and a signal relatively delayed by one line is selected and outputted between the times $t_5$ and $t_6$. Thus, correct scanning input image signals having no misregistration in the subscanning direction can be obtained as shown at FIGS. 1(d) and 2(d).

Figure 3:
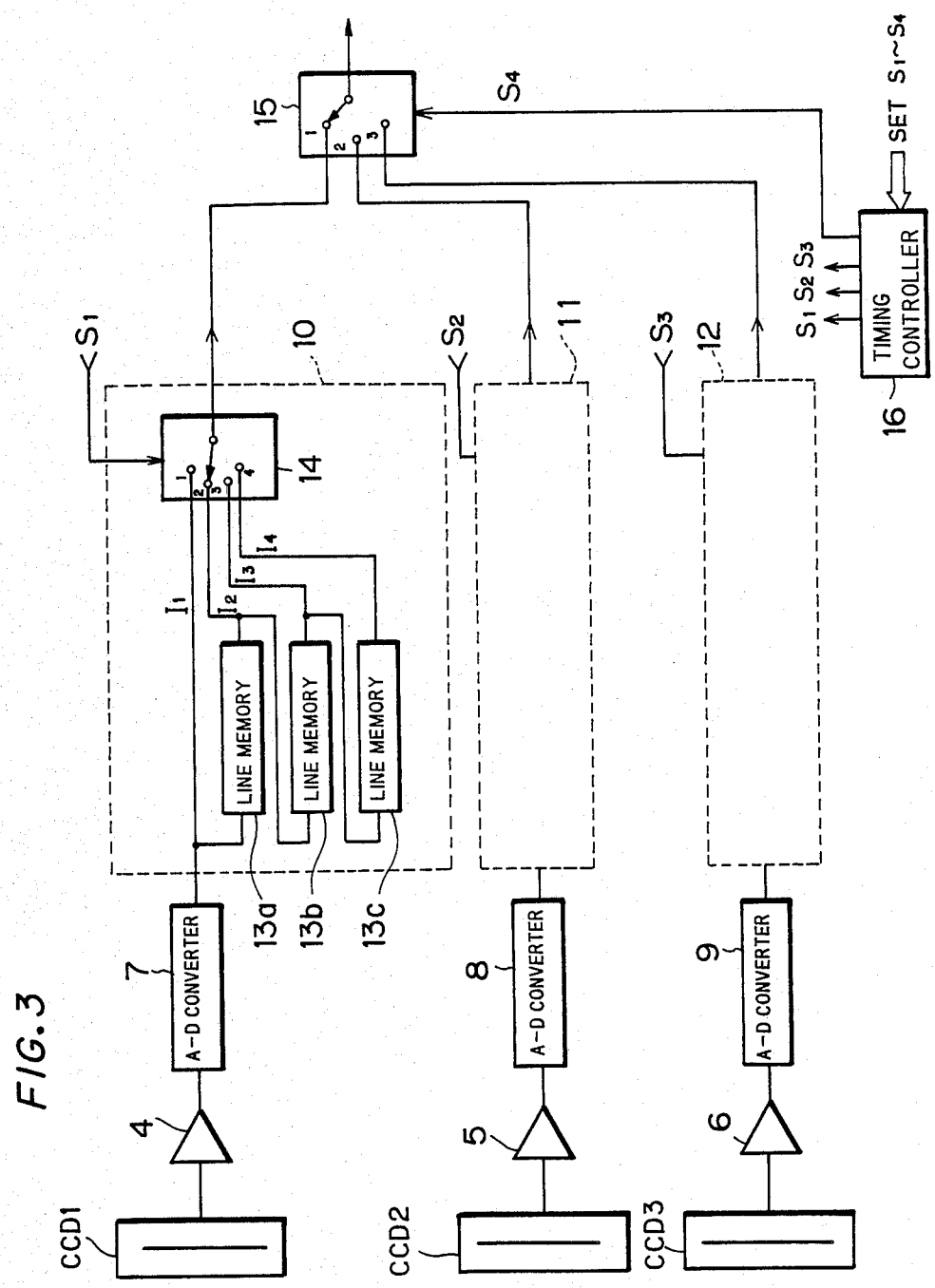

FIG. 3 is a block diagram showing exemplary structure of an apparatus for executing the inventive method as conceptually described above. Output image signals from three CCD's 1 to 3, which are arranged along the main scanning direction, are amplified by amplifiers 4 to 6, and then subjected to analog-to-digital conversion by A-D converters 7 to 9, to be inputted in storage parts 10 to 12 respectively. Although FIG. 3 typically shows structure of the storage part 10 only, the storage parts 11 to 12 are in the same structure. Each of the storage parts is constituted by three line memories 13a, 13b and 13c connected in series to progressively store inputted image signals in the number of pixels of the corresponding CCD respectively and a selector 14 for switching an input image signal $I_1$, an output image signal $I_2$ from the line memory 13a (i.e., image signal delayed by one line from $I_1$), an output image signal $I_3$ from the line memory 13b (i.e., image signal delayed by two lines from $I_1$) and an output image signal $I_4$ from the line memory 13c (i.e., image signal delayed by three lines from $I_1$) in response to selection signals $S_1$ to $S_3$ and outputting the same.

Output signals from the storage parts 10 to 12 are further switched by a selector 15 in response to a selection signal $S_4$ and outputted. The selection signals $S_1$ to $S_4$ are supplied by a timing controller 16, and the selection signals $S_1$ to $S_3$ are previously set on the basis of the aforementioned observation of the output image signals of the CCD's 1 to 3. As is well known in the art, the CCD's 1 to 3 are so arranged as to have overlapping scanning portions on an original 17 as shown in FIG. 4, for example, and signal switching (switching of the selector 15 by the selection signal $S_4$ in FIG. 3) on the boundary portion of each CCD in such case is well known for those skilled in the art.

With reference to FIG. 5, description is now made on the operation of the embodiment shown in FIG. 3. It is assumed here that the CCD's 1 to 3 are misarranged in the subscanning direction with respect to corresponding correct scanning positions on an original, as shown at FIG. 5(a). First, the original of a straight line L, which is parallel to the main scanning direction as shown at FIG. 5(b), is scanned and the input scanning image signals are obtained as shown at FIG. 5(c) and observed as hereinabove described. Thus, the number of scanning lines that represents amounts of read position errors in the subscanning direction corresponding to respective main scanning positions (main scanning timing) are in advance found in order to set the selection signals $S_1$ to $S_3$. Modes of the setting are shown at FIG. 5(d), (e) and (f) in detail. Reference numerals 1 to 4 correspond to input terminals 1 to 4 (i.e., image signals $I_1$ to $I_4$) of the selector 14 shown in FIG. 3. FIG. 5(g) shows the content of the selection signal $S_4$, in which reference numerals 1 to 3 correspond to input terminals 1 to 3 of the selector 15. FIG. 5(h) shows main scanning pulse signal for the CCD's 1 to 3, during whose one high level period, i.e. during whose one pulse duration one scanning performance in the main scanning direction is executed.

Here, the image signals as illustrated in FIG. 5(c) are obtained when the input terminal 1 of the selector 14 is selected in each of the storage parts 10 to 12 and the content of the selection signal $S_4$ is determind as depicted in FIG. 5(g).

In actual scanning, the selection signals $S_1$ to $S_4$ are supplied in the timing shown in FIGS. 5(d) to 5(g), so that the scanning input image signals by the CCD's 1 to 3 are delayed in accordance with the modes of the selection signals $S_1$ to $S_3$ and switched in accordance with the mode of the selection signal $S_4$, to be outputted as correct image signals having no position error in the subscanning direction, as shown at FIG. 5(i). If switching timing for delay is conducted incorrectly, or the original of the straight line L is not correctly straight, then there are produced image signals having quasi position errors, for example as illustrated in FIG. 5(j). Accordingly, the signals without any such quasi errors can be obtained by executing again the procedure after the switching timing is corrected or the original is amended to be straight on the basis of the observed result.

Figure 6:
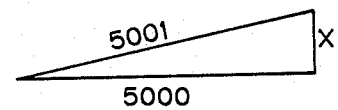
FIG. 6 is an explanatory view showing a range of correction.

Examination is made as to the maximum degree to which misarrangement can be correctable. Assuming that the employed CCD has 5,000 effective bits, the 5,000 effective bits must be held to whatever extent the CCD is inclined. With reference to FIG. 6, the CCD is inclined and 5,001 bits are required with respect to the main scanning direction when $$x=\sqrt{5001^2-5000^2} \approx 100 \text{ (pixels)}$$

and hence mechanical CCD assembling accuracy must be within 700 μm assuming that one pixal is 7 μm□. In practice, it is preferable to make the same less than 350 μm (x=50), the half thereof, in view of organization errors. Thus, if the CCD is obliquely misarranged within by 50 ines, correction can be relatively satisfactorily performed.

Figures 7, 8:
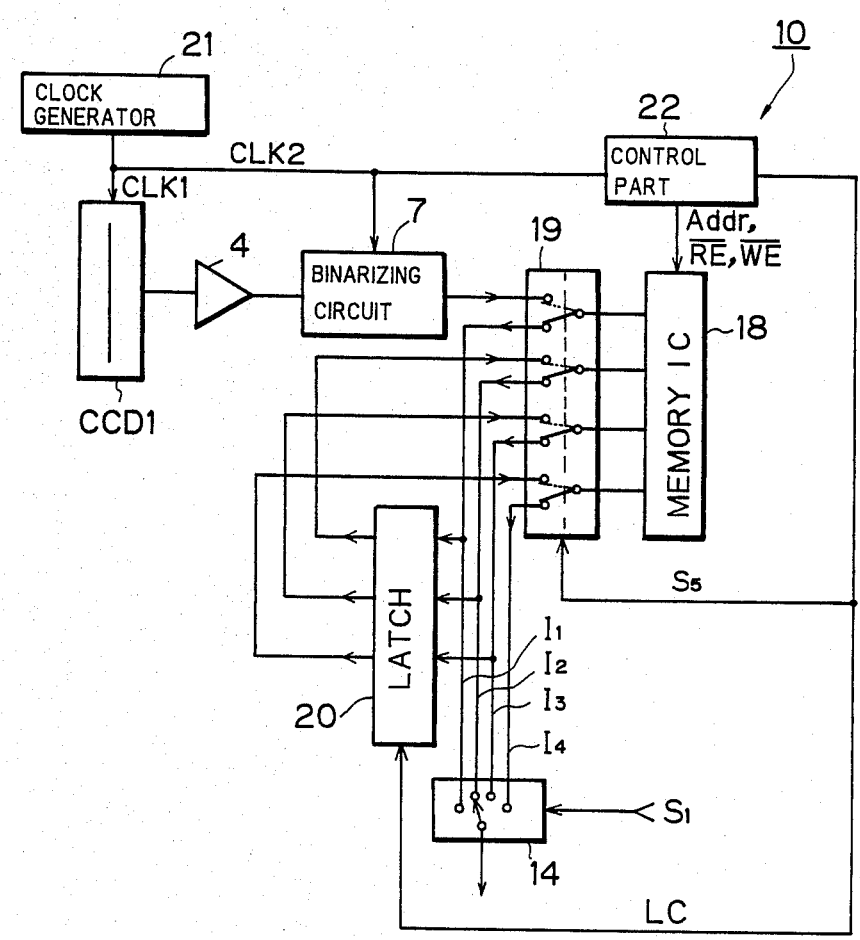
FIG. 7 is a block diagram showing another embodiment of the present invention.
FIG. 8 is a timing chart thereof.

FIG. 7 is a block diagram showing another example of the storage part 10 shown in FIG. 3. The line memories 13a to 13c are replaced by a memory IC 18, which has words larger in number than a pixel number of a CCD, whose word is four bits in length. Consider the case of black-and-white information processing, i.e. one bit processing, output of an A-D converter (binarization circuit) 7 is stored in a first bit location of the memory IC 18 through a selector 19, and then the first-bit content is read out to be supplied to a selector 14 as an image signal $I_1$ through the selector 19 and to be at the same time latched by a latch 20. Thereafter, in a similar manner, the latched content of the latch 20 is inputted and stored in a second bit location of the memory IC 18 through the selector 19, and then the second-bit content is read out to be supplied to the selector 14 as an image signal $I_2$ through the selector 19 and to be simultaneously latched by the latch 20. This latched content of the latch 20 is inputted and stored in a third bit location of the memory IC 18 through the selector 19, and then the third-bit content is read out to be supplied to the selector 14 as an image signal $I_3$ through the selector 19 and to be latched by the latch 20. This latched content of the latch 20 is inputted and stored in a fourth bit location of the memory IC 18 through the selector 19, and the fourth-bit content is read out to be supplied to the selector 14 as an image signal $I_4$ through the selector 19. A clock generator 21 provides clocks CLK 1 and CLK 2 for read timing of the CCD 1 and for conversion timing of the A-D converter 7. A control part 22 receives clocks CLK 2 from the clock generator 21 to perform address and timing control for write/read operation of the memory IC 18 and to perform switching timing control of the selector 19 and latch timing control of the latch 20.

FIG. 8 is a timing chart showing the operation of the circuits shown in FIG. 7. The selector 19 is switched as shown by solid lines in FIG. 7 during a period of high level of a selection signals $S_5$ from the control part 22, and signals are delivered to the selector 14 from the memory IC 18 in response to a read enable signal $\overline{RE}$ at high level from the control part 22, as signals $I_1$ to $I_4$ delayed by zero to four lines respectively, and latched by the latch 20 in response to the leading edge of a latch control signal LC from the control part 22. During a subsequent low level period of the selection signal $S_5$, the selector 19 is switched as shown in phantom in FIG. 7, so that the output signal of the A-D converter 7 and the latch content of the latch 20 are written in the memory IC 18 in response to a write enable signal $\overline{WE}$ at low level from the control part 22. A different memory address Addr is assigned to a subsequent pixel at a subsequent clock, and similar operation is performed. According to this example, storage of data for lines equal to a bit number forming a word is enabled by employing one memory IC with respect to one CCD line sensor.

Although description has been made with respect to the case of three CCD's in the above embodiment, the present invention can be similarly applied to the case of a single CCD or any plural CCDs, to attain the same effect.

The present invention can also be applied to a conventional method of projecting an original image to a plurality of line image sensors which are alternately displaced by a plurality of scanning lines in the subscanning direction by means of a single lens, storing a signal from a preceding scanning sensor in a memory by the displaced scanning lines, and delaying the same thereby to render the same in timing with a signal from a following scanning sensor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of correcting a read position error in subscanning direction in scanning and inputting of image data by a line image sensor provided in parallel with main scanning direction, said method comprising steps of:
    finding an amount of said read position error in said subscanning direction with respect to each main scanning position of said line image sensor by a number of scanning lines; and
    relatively delaying an output image signal from said line image sensor with respect to each said main scanning position on the basis of said number of scanning lines corresponding to said amount of the read position error in the subscanning direction thus found, to output the same.

2. A method of correcting a read position error in subscanning direction in accordance with claim 1, wherein a plurality of said line image sensors are arranged in the main scanning direction to read one main scanning line in a divided manner.

3. A method of correcting a read position error in subscanning direction in accordance with claim 1, wherein said amount of the read position error in the subscanning direction with respect to each main scanning position is found by reading an original of a straight line in parallel with the main scanning direction.

4. A method of correcting a read position error in subscanning direction in accordance with claim 1, wherein
    said delaying step includes steps of:
    creating image signals by delaying said output image signal of said line image sensor by 0 to n (n: natural number) lines; and
    selecting one of said created image signals in accordance with said number of scanning lines corresponding to said amount of the read position error in the subscanning direction.

5. An apparatus for correcting a read position error in subscanning direction in scanning and inputting of image data by a line image sensor provided in parallel with main scanning direction, said apparatus comprising:
    means for indicating an amount of a read position error in the subscanning direction with respect to each main scanning position of said line image sensor, said amount being found in advance by a number of scanning lines; and
    means for delaying an output image signal from said line image sensor with respect to in each main scanning position by said number of scanning lines corresponding to said amount of the read position error in the subscanning direction, on the basis of said indication, and outputting the same.

6. An apparatus for correcting a read position error in subscanning direction in accordance with claim 5, wherein a plurality of said line image sensors are arranged in the main scanning direction to read one main scanning line in a divided manner.

7. An apparatus for correcting a read position error in subscanning direction in accordance with claim 5, wherein said amount of the read position error in the subscanning direction with respect to each main scanning position of said line image sensor indicated by said indicating means is found by reading an original of a straight line parallel to the main scanning direction.

8. An apparatus for correcting a read position error in subscanning direction in accordance with claim 5, wherein
    said means for delaying and outputting the output image signal of said line image sensor comprises:
    means for creating image signals by delaying the output image signal of said line image sensor by 0 to n (n: natural number)lines; and
    means for selecting one of said created image signals in accordance with indication by said indicating means.

9. An apparatus for correcting a read position error in subscanning direction in accordance with claim 8, wherein said means for creating said image signals includes n line memories for delaying the output image signal of said line image sensor by 1 to n lines.

10. An apparatus for correcting a read position error in subscanning direction in accordance with claim 8, wherein said means for creating said image signals includes a memory IC for delaying the output image signal of said line image signal by 1 to n lines, a word of said memory IC being formed by n bits.

* * * * *